(12) United States Patent
Zimmermann

(10) Patent No.: US 8,094,291 B2
(45) Date of Patent: Jan. 10, 2012

(54) DEVICE FOR A LENGTH MEASUREMENT AND ADAPTER FOR ACCOMODATING A DEVICE FOR A LENGTH MEASUREMENT

(75) Inventor: Thomas Zimmermann, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 175 days.

(21) Appl. No.: 12/568,873

(22) Filed: Sep. 29, 2009

(65) Prior Publication Data

US 2010/0103406 A1    Apr. 29, 2010

(30) Foreign Application Priority Data

Sep. 29, 2008   (DE) .................. 10 2008 042 440

(51) Int. Cl.
*G01C 3/08*   (2006.01)
(52) U.S. Cl. ...................................... 356/4.01
(58) Field of Classification Search ......... 356/3.01–28.5
See application file for complete search history.

(56) References Cited

U.S. PATENT DOCUMENTS

| 5,900,931 | A | 5/1999 | Rando |
| 7,456,936 | B2 | 11/2008 | Gogolla et al. |
| 2007/0107249 | A1 | 5/2007 | Marocco et al. |
| 2007/0206174 | A1* | 9/2007 | Boegel et al. ............. 356/4.01 |
| 2008/0266541 | A1* | 10/2008 | Yung et al. ............... 356/4.01 |

FOREIGN PATENT DOCUMENTS

| DE | 1916006 | | 10/1970 |
| EP | 1 475 608 | | 11/2004 |
| EP | 1 566 658 | A1 | 8/2005 |
| EP | 1 679 528 | A2 | 7/2006 |
| EP | 1 722 192 | A2 | 11/2006 |
| JP | 2004-233106 | | 8/2004 |
| WO | WO 02/09023 | | 1/2002 |
| WO | WO0209023 | * | 1/2002 |

* cited by examiner

*Primary Examiner* — Thomas Tarcza
*Assistant Examiner* — Luke Ratcliffe
(74) *Attorney, Agent, or Firm* — Merchant & Gould P.C.

(57) ABSTRACT

The invention relates to a device for a length measurement providing a housing, a sending device for producing an optical measuring beam, a receiving device for detecting parts of the measuring beam that have beam scattered back from the measuring object and a redirecting device for redirecting the measuring beam that has been send out by the sending device and/or the receiving area of the receiving device. The invention relates also to an adapter for accommodating a device for a length measurement with a housing, a sending device for producing an optical measuring beam and a receiving device for detecting parts of the measuring beam that is scattered back from the measuring object, whereby the adapter provides frame for accommodating the device and a redirecting device for redirecting the measuring beam that has been send out by sending device and/or the receiving area of the receiving device.

13 Claims, 6 Drawing Sheets

DEVICE FOR A LENGTH MEASUREMENT AND ADAPTER FOR ACCOMODATING A DEVICE FOR A LENGTH MEASUREMENT

This application benefit of Serial No. 10 2008 042 440.4, filed 29 Sep. 2008 in Germany and which application is incorporated herein by reference. To the extent appropriate, a claim of priority is made to the above disclosed application.

TECHNICAL FIELD

The invention is based on a device and an adapter according to the category of the independent claims.

A portable distance measuring instrument is known from EP 1 475 608 A2, which contains an electroscopic distance measuring module, consisting of an electrical beam source for producing an optical measuring beam, a beam receiver for receiving parts of the measuring beam that is scattered back by the measuring object and an output tool for the determined distance as well as a mechanic distance measuring tool (for example a steel measuring tape or a link measuring stick). Both measuring tools are hereby connected with each other in a fixed arrangement, which allows a length measurement only along a direction that is provided by this arrangement. It is in particular not possible to target a reference point with the electroscopic distance measuring device, which is not arranged in the measuring direction. It is also not possible to carry out length measurements in more than one direction without moving the device.

BACKGROUND

The device and the adapter according to the invention with the characteristics of the independent claims have therefore the advantage that the measuring beam that is send by the sending device and/or the receiving area of the receiving device can be redirected by the redirecting device, whereby it is possible to carry out a length measurement in two direction without having to move the device.

Therefore the redirecting device can be arranged in a first position in such a way that it does not influence the measuring beam that is send by the sending device nor the receiving area of the receiving device. Then a length measurement can be carried out in a first direction (forwards) by the device or a device that is accommodated by the adapter.

Subsequently the redirecting device is arranged in a second position in such a way that it redirects the measuring beam that is send out by the sending device as well as the receiving area of the receiving device in a second direction. Without having to move the device a length measurement can now be carried out in a second direction, which is provided by the arrangement of the redirecting device (sideways). A measurement that is carried out "sideways" means hereby a measurement that deviates from the first direction; that can be a measurement to the right, left, upwards or downwards, which means redirected by 90°, but also a measurement in a direction that does not stand vertical on the first direction but encloses with it another angle (for example 45°).

The redirecting of the optical measuring beam can also be used to adjust the device to a reference point (for example the ground or the top) without carrying out a measurement in that direction. The optical measuring beam can for example at first be redirected upwards by the redirecting device so that it is possible to position the device according to the invention or the adapter according to the invention below a reference point that is given at the top of a space. Subsequently the redirecting device is removed or moved in such a way that the optical beam is not redirected upwards anymore by the redirecting device. A length measurement can now be carried out along the first direction, whereby the device measures from a specific reference point.

In a preferred embodiment the redirecting device is connected movably with the housing of the device or with the frame of the adapter. This enables a simple arrangement of the redirecting element in the first position, in which it does not influence the measuring beam that is send out by the sending device nor the receiving area of the receiving device, as well as in the second position, in which it redirects the measuring beam that is send out by the sending device and/or the receiving area of the receiving device in the second direction. Also the alternation of the redirecting element between the two positions is thereby simplified without the danger that the device is moved.

In a particularly preferred embodiment the redirecting device provides a sled and the housing of the device or the frame of the adapter provides at least one guiding element for guiding the sled. Thereby the redirecting element can be moved between the two positions without a high resistance.

In a further preferred embodiment the redirecting device provides a mirror or a prism or another redirecting element that qualifies for the wave length of the optical measuring beam.

In a further preferred embodiment the device or the adapter provides a level or a similar element for a horizontal alignment of the device. This is in particular necessary if a reference point has to be targeted at the top with the redirected optical measuring beam based on which a length measurement shall take place.

At usual electroscopic devices for a length measurement the length measurement takes usually place from a reference plane of the device. That can be determined by the back or front end of the device, or also by an attachment possibility for a tripod in the middle of the device. The used reference plane can be adjusted at the device, so that the result of the length measurement that is shown by the device illustrates the length that has been determined based on the reference plane.

At a measurement "sideways" along the second direction by redirecting the optical measuring beam and the receiving area of the measuring optic the length should preferably be measured from the redirecting point of the optical measuring beam at the redirecting device up to the measuring object. Therefore the offset has to be subtracted from the actually determined length, which results thereby in that the optical measuring beam runs at first a little along the first direction "forwards" up to the redirecting device. Preferably this consideration of the offset takes place automatically if the device detects with the aid of a position detector at the device or the adapter that the redirecting direction is located in the second position, in which it redirects the measuring beam that has been send out by the sending device as well as the receiving area of the receiving device in the second direction. But it is also possible to activate the consideration of the offset manually at the device.

In a further preferred embodiment the device or the adapter provides a mechanic measuring device, with which a length measurement can also be carried out. The mechanic measuring device allows for example a length measurement along the outside of a measuring object, if the length that has to be measured is not limited by a measuring area, which scatters the measuring beam at least partially back to the device.

The mechanic measuring device can for example be a measuring tape or a link measuring stick and can be arranged at the side of the device or the adapter.

The mechanic measuring device also allows to carry out a length measurement in a direction while the optical measuring beam is redirected by the redirecting device and is for example used to target a reference point based on which the measurement shall take place.

In a further preferred embodiment the mechanic measuring device is connected with the housing of the device or the frame of the adapter in a movable way (for example rotatable or foldable), so that the direction, in which the measurement with the mechanic measuring device shall take place, can be changed.

In a further preferred embodiment the length that has been measured with the mechanic measuring device can be read automatically (for example with the aid of a magnetic or an optical code on the measuring stick or on the barrel of the measuring tape) and be illustrated on a display element of the device. The adapter according to the device provides therefore an interface for transmitting the measured length to the device that is accommodated in the adapter.

In a further preferred embodiment of the adapter it provides at least one holding element for holding the device for the length measurement.

BRIEF DESCRIPTION OF THE DRAWINGS

With the aid of the drawings the invention is subsequently explained explicitly. It is shown in.

DETAILED DESCRIPTION

Figure 1:
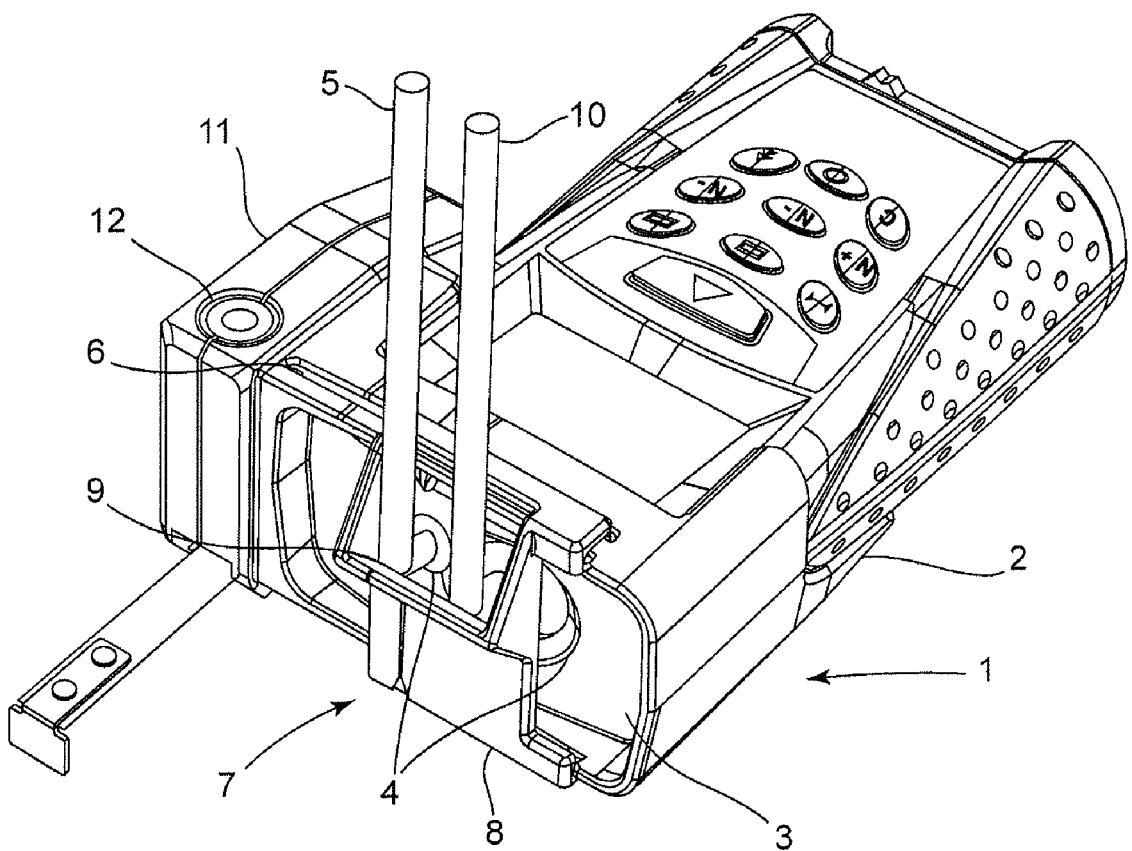
FIG. 1 is a first embodiment of an adapter according to the invention with an accommodated device for a length measurement.

FIG. 1 shows an embodiment of an adapter according to the invention for accommodating an electroscopic device for a length measurement, in which such a device is accommodated.

The adapter (1) provides a frame (2), in which the device is inserted and in which it is held securely. The device has recesses (4) at its front end for the pass-through of the optical measuring beam (5) and of parts of the measuring beam that have been scattered back from the measuring object.

Two track-like guiding elements (6) are also arranged at the front end of the frame, along which the sled (8) of a redirecting device (7) can move. The redirecting device provides furthermore a mirror (9) for redirecting the optical measuring beam and the receiving area (10, here shown schematically) of the receiving device.

The redirecting device is shown in its second position, in which it also redirects the optical measuring beam as well as the receiving area of the receiving device by 90° upwards.

A measuring band (11) is attached on the side of the frame as mechanic measuring device, which allows a length measurement that is independent from the electroscopic device.

A level (12) is located on the top side of the measuring tape for a horizontal alignment of the device.

The redirecting device can be moved back and forth along the track-like guiding elements between the first and the second position. Thereby the length measurements are possible upwards as well as frontwards without having to shift the device.

Figure 2:
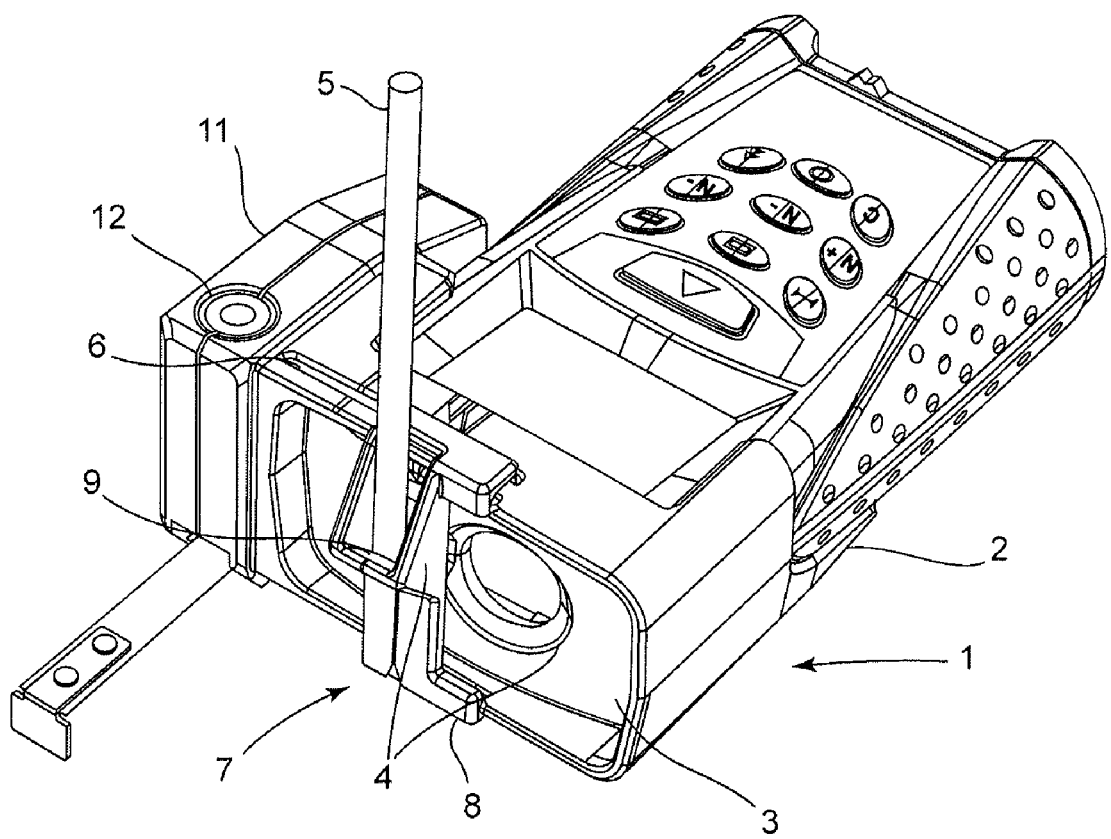
FIG. 2 is a second embodiment of an adapter according to the invention with an accommodated device for a length measurement.

FIG. 2 shows a further embodiment of an adapter according to the invention for accommodating an electroscopic device for a length measurement, in which such a device is accommodated.

The adapter (1) provides a frame (2), in which the device is inserted and in which it is held securely. The device has recesses (4) at its front ends for the pass-through of the optical measuring beam (5) and of parts of the measuring beam that have been scattered back from the measuring object.

Two track-like guiding elements (6) are also arranged at the front end of the frame, along which the sled (8) of a redirecting device (7) can move. The redirecting device provides furthermore a mirror (9) for redirecting the optical measuring beam and the receiving area (10, here shown schematically) of the receiving device.

The redirecting device is shown in its second position, in which it also redirects the optical measuring beam as well as the receiving area of the receiving device by 90° upwards.

Thereby it is possible to target a reference point at the top based on which the length measurement shall take place.

A measuring tape (11) is attached on the side of the frame as mechanic measuring device, which allows a length measurement that is independent from the electroscopic device.

A level (12) is located on the top side of the measuring tape for a horizontal alignment of the device.

Figure 3:
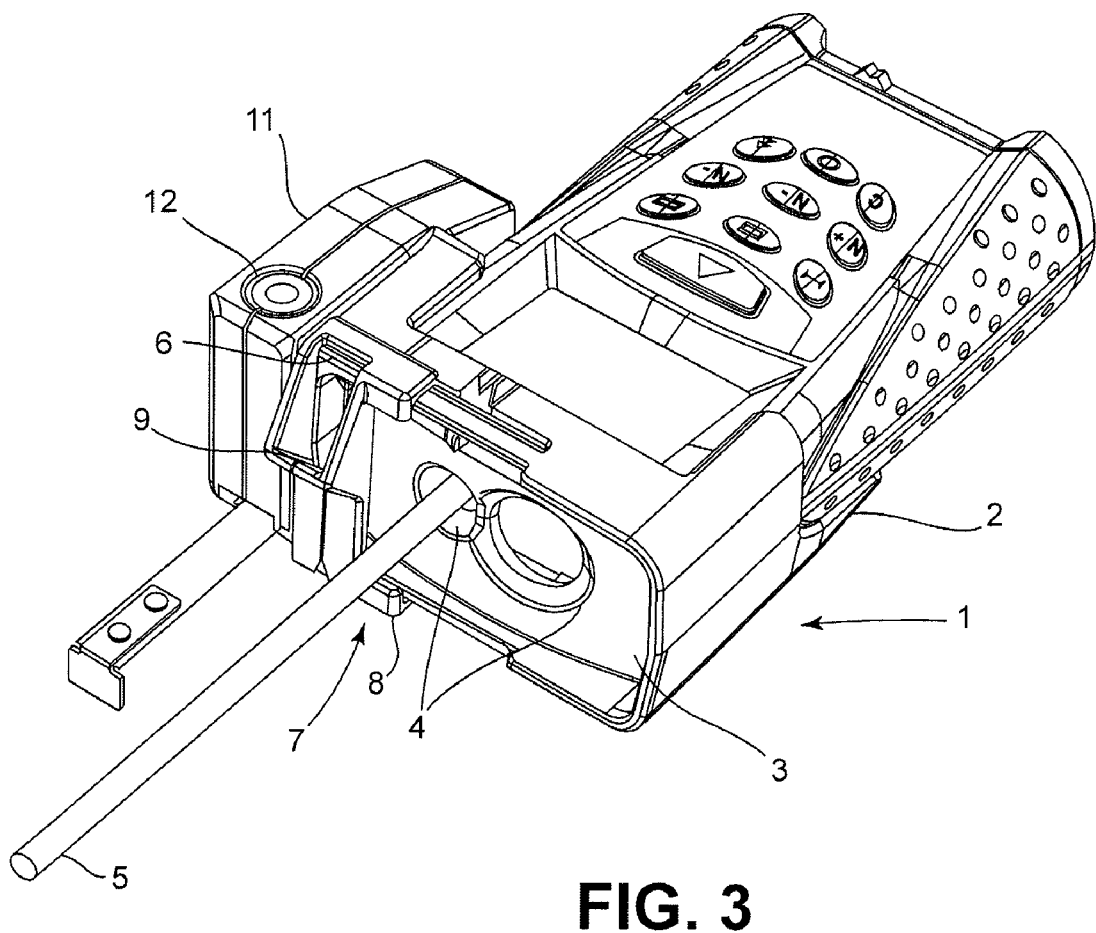
FIG. 3 is the embodiment according to FIG. 2, whereby the redirecting device is located in a first position.

FIG. 3 shows the adapter from FIG. 2 with an accommodated device for a length measurement, whereby the redirecting device is shown in this figure in its first position, in which it does not influence the optical measuring beam. Therefore a length measurement can take place with the electroscopic device "frontwards" after the device has been aligned before at a reference point at the top.

Figure 4:
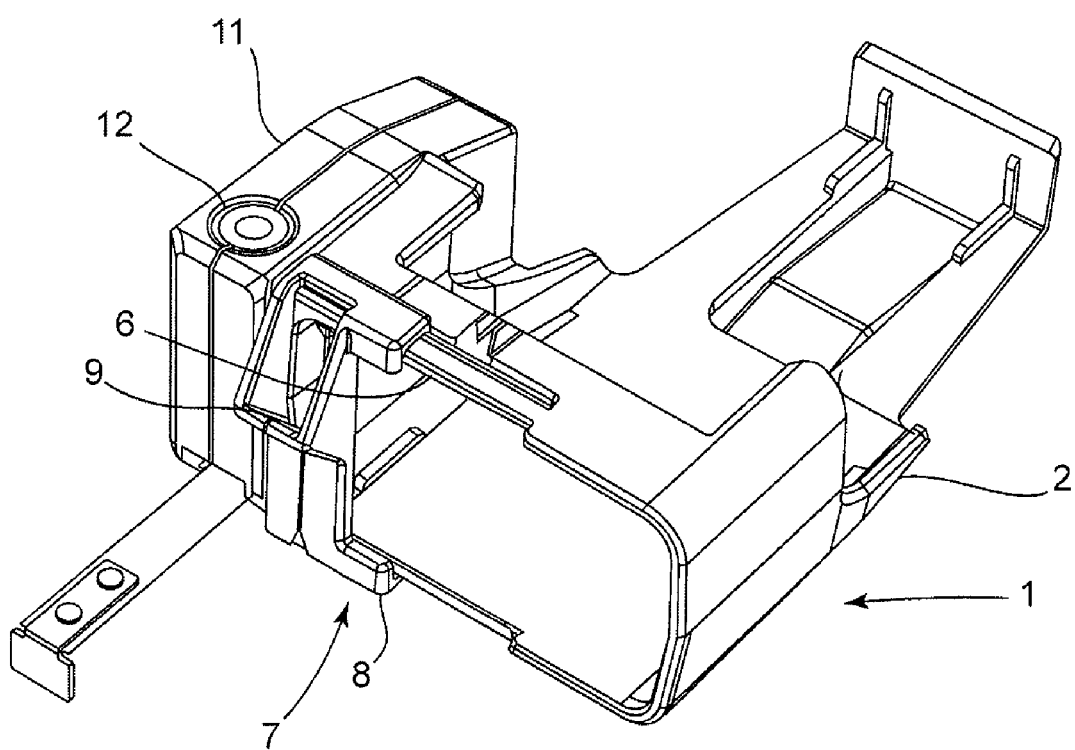
FIG. 4 is the second embodiment of an adapter according to the invention without an accommodated device for a length measurement.

FIG. 4 shows the adapter from FIG. 3 without an accommodated device for a length measurement.

Figure 5:
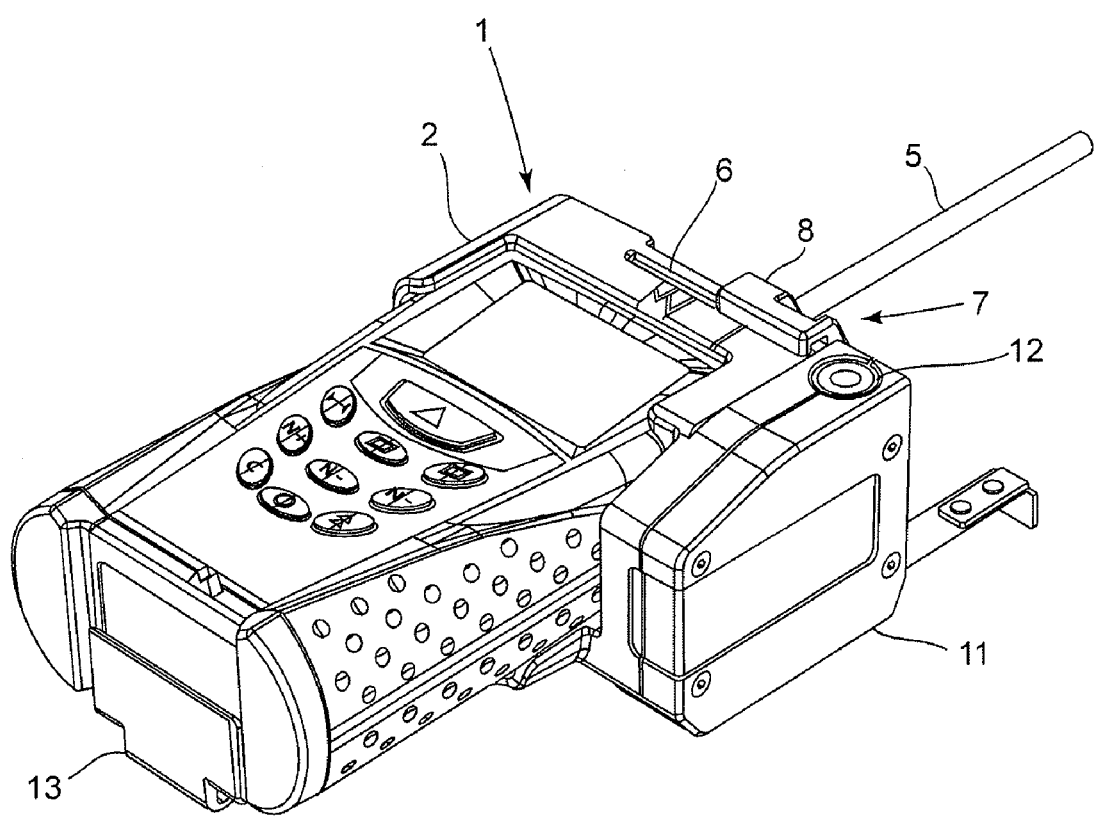
FIG. 5 is the second embodiment of an adapter according to the invention accommodating a device for a length measurement from behind.

FIG. 5 shows the adapter with an accommodated device from FIG. 3 in another view. The holding element (13) can be clearly seen here, with which the device for a length measurement is held securely in the adapter.

Figure 6:
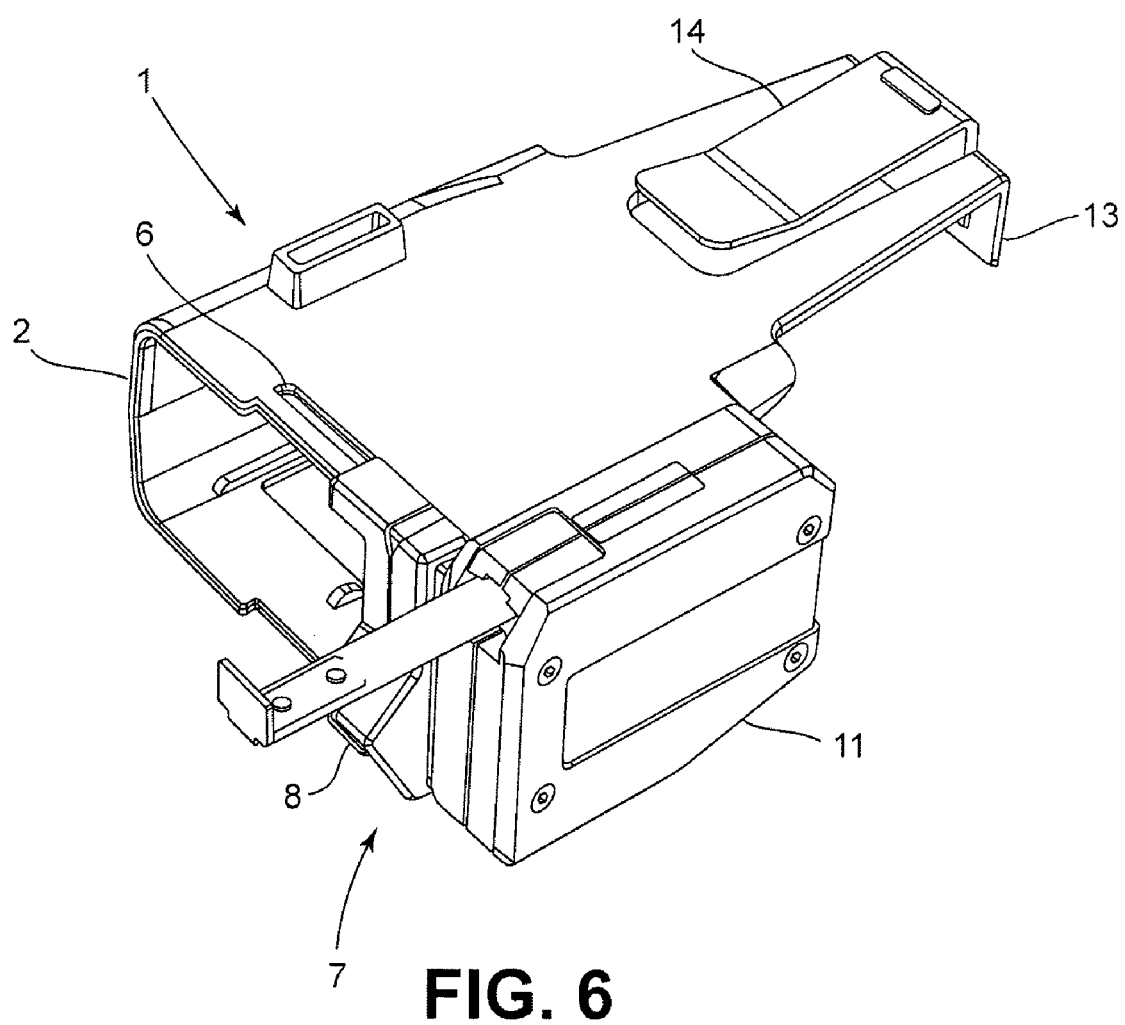
FIG. 6 is the second embodiment of an adapter according to the invention without an accommodated device for a length measurement from below.

FIG. 6 shows the adapter without the accommodated device from FIG. 4 in a view from below. A belt clip (14) can be seen here, with which the adapter can for example be attached at the clothes of the operator.

The invention claimed is:

1. A length measurement device comprising:
a housing;
a sending unit for creating an optical measuring beam;
a receiving unit for detecting parts of the measuring beam that is scattered back by a measuring object; and
a redirecting arrangement for redirecting the measuring beam that has been send out by the sending unit and/or the receiving area of the receiving unit, wherein the redirecting arrangement is slidable connected to the housing and has a first position allowing for length measurement in a first direction and a second position allowing for length measurement in a second direction.

2. The length measurement device according to claim 1, wherein the redirecting arrangement includes a sled and whereby the housing includes at least on one guiding element for guiding the sled.

3. The length measurement device according to claim 1, wherein the redirecting arrangement includes a mirror or a prism.

4. The length measurement device according to claim 1, further comprising a mechanic measuring device.

5. The length measurement device according to claim 4, wherein the mechanic measuring device is connected movably to the housing.

6. The length measurement device according to claim 4, further comprising a display element for displaying the length that has been measured by the optical measuring beam, whereby the measuring value of the mechanic measuring device can be displayed on the display element.

7. An adapter including a frame for accommodating a length measurement device, the length measurement device comprising:
- a housing;
- a sending unit for producing an optical measuring beam;
- a receiving unit for detecting parts of the measuring beam that is scattered back by a measuring object; and
- a redirecting arrangement for redirecting the measuring beam that has been send out by the sending unit and/or the receiving area of the receiving unit, wherein the redirecting arrangement is slidable connected to the frame and has a first position allowing for length measurement in a first direction and a second position allowing for length measurement in a second direction.

8. The adapter according to claim 7, wherein the redirecting arrangement includes a sled and whereby the frame includes at least one guiding element for guiding the sled.

9. The adapter according to claim 7, wherein the redirecting arrangement includes a mirror or a prism.

10. The adapter according to claim 7, whereby the adapter includes a mechanic measuring device.

11. The adapter according to claim 10, wherein the mechanic measuring device is connected movably to the frame.

12. The adapter according to claim 10, wherein the adapter includes an interface for transmitting the length that has been measured by the mechanic measuring device to the length measurement device.

13. The adapter according to claim 7, wherein the adapter includes at least one holding element for holding the length measurement device.

* * * * *